United States Patent [19]

Singleton

[11] 4,235,637

[45] Nov. 25, 1980

[54] ANTI-FOGGANT COMPOSITION

[76] Inventor: Rudolph Singleton, 4920 Roja Dr., Oceanside, Calif. 92054

[21] Appl. No.: 43,152

[22] Filed: May 29, 1979

[51] Int. Cl.$^3$ .............................................. C08L 3/00
[52] U.S. Cl. ................................................... 106/213
[58] Field of Search ................... 106/5, 13, 211–213; 252/70; 127/32

[56] References Cited

U.S. PATENT DOCUMENTS

| | | | |
|---|---|---|---|
| 3,350,314 | 10/1967 | Dawtrey et al. | 106/13 |
| 4,073,756 | 2/1978 | Yotsuyanagi et al. | 106/211 |

OTHER PUBLICATIONS

Chem. Abst. 82: 74,837t, Jul. 27, 1974.

*Primary Examiner*—Theodore Morris
*Attorney, Agent, or Firm*—Brown & Martin

[57] ABSTRACT

An anti-foggant composition for application to glass and plastic surfaces comprising the combination of a surfactant and of a lower polyhydric alcohol, each associated with starch granules with the aid of a volatile lower alcohol which also serves as a vehicle for application of the composition.

8 Claims, No Drawings

ANTI-FOGGANT COMPOSITION

BACKGROUND OF THE INVENTION

This invention relates to compositions for prevention of fogging on surfaces.

Fogging on surfaces such as windshields, eye glasses and mirrors from condensation of moisture presents a serious problem. Gradual development of fog which may reduce visibility without being noticed and quick development of fog are responsible for a number of accidents. Also, the clouding up of mirrors in bathrooms and of windows on cold days is an annoying situation.

Because of the manners in which fogging occurs, it is important that any anti-foggant treatment adhere firmly to protect against fogging for a substantial period, that is, at least several days and that it be initially clear and remain clear without collecting dust over this period. Anti-foggant compositions must not attack the transparent plastic increasingly used in eye glasses and windows and must be non-toxic as used. Additionally, anti-foggants should be easy to apply and inexpensive.

BRIEF STATEMENT OF THE INVENTION

It is an object of the present invention to provide a novel, easy to apply and long lasting anti-foggant which is compounded of inexpensive ingredients, and which is safe for use on both glass and transparent plastic surfaces.

The anti-foggant of my invention is a combination in special relations and proportions of a surfactant, a lower polyhydric alcohol, starch granules, and a volatile lower alcohol serving both to aid in association of the surfactant and the polyhydric alcohol with the starch granules and also as a vehicle for application of the composition for anti-fogging purposes. I have further found that a superior compositions is secured where the polyhydric alcohol and the surfactant are separately associated with starch granules. In this relationship, the components are particularly effective to provide a useful cleaning action and the laying down of a deposit to prevent fogging on surfaces such as glass and transparent plastics.

DETAILED DESCRIPTION OF THE INVENTION

Association of the surfactant and the polyhydric alcohol with the starch granules is effected by mixing in the presence of a volatile lower alcohol. The starch granules, which may be a commercially available starch such as ordinary corn starch, is preferably divided into two portions of which a first portion is mixed with the surfactant and lower alcohol, and a further portion of starch is mixed with the polyhydric alcohol and lower alcohol. The two mixtures are combined to form the final anti-foggant composition.

It is believed that with the assistance of the lower alcohol, a stable relation is established between the starch and the surfactant, a first part on the one hand, and between the starch and the polyhydric alcohol, a second part on the other such that when the first and second parts are combined, the relation of starch granules and the component with which they were separately associated persists and the components function in the final mixture to give an improved cooperative action when applied to the surface. It is to be understood that this theory of operation is given only to assist in understanding the invention and that patentability is not dependent on correctness of the theory.

Surfactants useful in the new composition may be commercially available materials. It has been found that an aqueous dispersion of a mixture of anionic and non-ionic surfactants, for example the household detergent sold as "Ivory Liquid" is very satisfactory. However, other surfactants with similar properties may be used.

Association of the surfactants with starch to form the first part is effected by mixing the surfactants with the starch and adding a lower alcohol such as isopropyl alcohol, propyl alcohol, or ethyl alcohol or methyl alcohol. A commercially available 70% by volume isopropyl alcohol is inexpensive and has been found satisfactory for this use. The relative proportions of starch and surfactant may range from about 150% of the volume of the starch to as little as 75% by volume based on the volume of the starch. The volume of alcohol used will vary depending on the relative proportions of starch and surfactants and may be from about 25% to about 45% by volume based on the volume of the starch. That is, somewhat higher proportions of alcohol will be used where the proportions of surfactants relative to the starch are in the lower part of the range in order to form a flowable mixture.

Association of the polyhydric alcohol and starch to form the second part is accomplished by a similar procedure in which the starch and polyhydric alcohol are mixed and a volatile lower alcohol is added to the mixture. Polyhydric alcohols useful in the present composition include glycerine and the two and three carbon glycols such as ethylene glycol and propylene glycol. In this second part, it has been preferred to use a 91% by volume isopropyl alcohol rather than the 70% by volume isopropyl alcohol used in the first part. The relative proportions of the polyhydric alcohol and starch are preferably in the range of from about 90% to about 125% by volume of polyhydric alcohol based on the volume of the starch. The volume of the lower alcohol used will vary depending on the relative proportions of starch and polyhydric alcohol and preferably is from about 20% to about 35% by volume based on the volume of the starch in the second part, the amount used depending on the amount needed to form a flowable mixture.

The separately prepared first part and second part are combined in relative amount to give a final composition in which, based on 100 parts by volume of starch, there are from about 50 to about 120 parts by volume of the surfactants and from about 15 to about 35 parts by volume of polyhydric alcohol, and in which there is from about 10% to about 25% by volume of alcohol based on the volume of the total composition. The new composition has a fluidity suitable for application either as a spray of by spreading with an applicator.

The anti-foggant composition is applied to the surface to be protected by any suitable means, such as a piston or a squeeze bottle spray device or by application with a fabric or other applicator. The applied material is spread around with a cloth or other wiper and leaves a clear invisible deposit. As tested by blowing warm moist air against a chilled surface, it is clearly apparent that while no fog forms on the treated surface, fog develops and remains on untreated portions of the surface.

If desired, the composition may be diluted with up to about 50% of water based upon the weight of the basic composition. Dilution appears to reduce the length of time that treated surfaces resist fogging, but the diluted composition has been satisfactory for treating the lenses of eye glasses which are normally cleaned at least once a day.

The following examples are given to aid in understanding the invention, but it is to be understood that the invention is not restricted to the particular materials, proportions, or procedures given in the examples.

EXAMPLE 1

Twenty four parts by volume of corn starch were combined with 32 parts by volume of a commercial mixture of anionic and non-ionic surfactants "Ivory Liquid", and eight parts by volume of a 70% by volume isopropyl alcohol and the composition was thoroughly mixed to form a composition having somewhat the consistency of a thick whipped cream.

Eight parts by volume of corn starch were combined with eight parts by volume of glycerine and two parts by volume of isopropyl alcohol and thoroughly mixed.

This mixture was added to the first prepared mixture and stirred to form a smooth uniform blend. The blend was freely fluid.

The above composition was applied on samples of transparent plastic including an acrylic material known as Plexiglas G, a press polished cellulose acetate butyrate, and on a polycarbonate "Lexan", as well as on a piece of glass. The applied material was spread over a portion of each sample, leaving a further portion of each sample untreated and the treated surfaces were wiped with a soft cloth. A one micro-liter quantity of deionized water was placed on each treated surface and the area to which the drops spread was measured as an indication of the degree of hydrophilicity. The larger the surface area covered, the more hydrophilic is the surface and correspondingly the more effective the composition as a fog preventing agent. The average surface area covered by the quantity of water deposited in each instance was about 22 square millimeters which is considered an excellant value for anti-foggant effectiveness. In a further test, each piece of material was placed over a cup containing ice to cool it, and when cooled the plastics were breathed upon. In each case, the portions of surface coated with the anti-foggant material exhibited no signs of fogging, while the uncoated portions of the surfaces fogged rapidly.

Each of the samples was then tested to determine the adhesion of the anti-foggant by pressing a pressure sensitive adhesive tape against the treated surface. The tape used was 3M brand Type 250 tape available from Minnesota Mining and Manufacturing Company, Saint Paul, Minn. After stripping the tape, each of the samples was chilled by placing it over the ice. It was found that the anti-foggant deposit remained adhered to the surface and effective to prevent fogging.

EXAMPLE 2

Twenty four parts of a volume of starch were mixed with 32 parts by volume of a surfactant mixture as in Example 1, and eight parts by volume of ethyl alcohol (70%) were added and the composition thoroughly mixed.

Eight parts by volume of starch were mixed with eight parts by volume of propylene glycol and two parts by volume of ethyl alcohol (70%). The composition was thoroughly mixed and combined with the surfactant composition. The resulting mixture was freely fluid and capable of application by conventional squeeze bottle or piston pump spray devices.

When applied to transparent plastic and glass surfaces, the composition proved to be an effective anti-foggant.

Having described my invention, what I claim as new and desire to protect by Letters Patent of the United States is:

1. An anti-foggant composition comprising in combination an intimate mixture of the association products of 100 parts by volume of starch granules, from about 50 to about 120 parts by volume of a surfactant, from about 15 to about 35 parts by volume of a lower polyhydric alcohol and an amount of a volatile lower alcohol to provide a freely flowable mixture.

2. An anti-foggant composition as defined in claim 1 in which said surfactant is associated with a portion of said starch granules and said lower polyhydric alcohol is associated with a further portion of said starch granules.

3. An anti-foggant composition as defined in claim 2, in which said composition comprises from about 10% to about 25% by volume of a lower alcohol based on the total volume of the composition.

4. An anti-foggant as defined in claim 3, in which said composition comprises the association product of a surfactant and starch granules formed with the aid of a lower alcohol and a further separately formed association product of a polyhydric alcohol and starch granules formed with the aid of a lower alcohol.

5. An anti-foggant composition as defined in claim 4, in which the first mentioned association product is a combination of 100 parts by volume of starch granules, from about 75 to 150 parts by volume of a surfactant and from about 25 to about 45 parts by volume of a lower alcohol and in which the second mentioned association product is a combination of 100 parts by volume of starch granules, from about 90 to about 125 parts by volume of a polyhydric alcohol and from about 20 to about 35 parts by volume of a lower alcohol.

6. An anti-foggant composition as defined in claim 5, in which said polyhydric alcohol is a member of the group consisting of glycerine, propylene glycol and ethylene glycol.

7. An anti-foggant composition as defined in claim 6, in which said polyhydric alcohol is glycerine, and said lower alcohol is a member of the group consisting of methyl alcohol, ethyl alcohol, isopropyl alcohol, and propyl alcohol.

8. An anti-foggant as defined in claim 6, in which said polyhydric alcohol is propylene glycol and said lower alcohol is a member of the group consisting of methyl alcohol, ethyl alcohol, isopropyl alcohol, and propyl alcohol.

* * * * *